April 9, 1940.   V. HARTLEY   2,196,917
MEANS FOR PRODUCING A SEED CARRIER
Filed Feb. 11, 1939   3 Sheets-Sheet 2
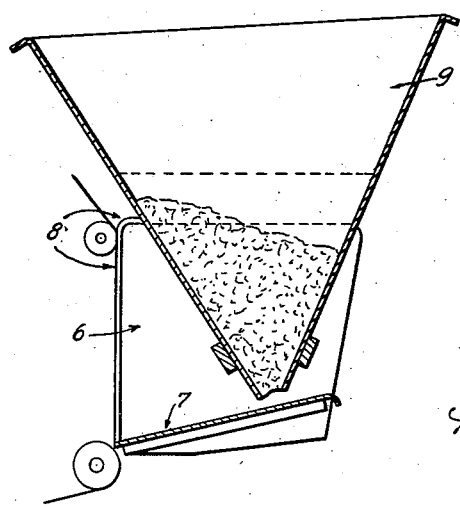
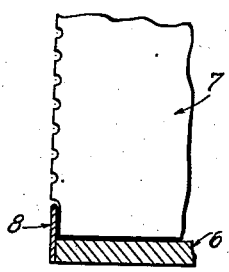
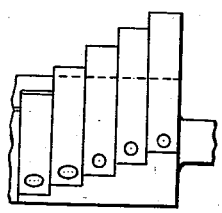
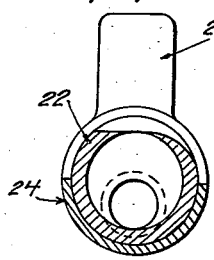
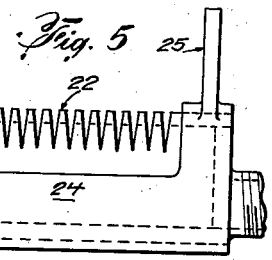
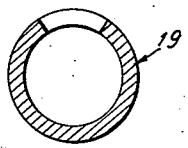
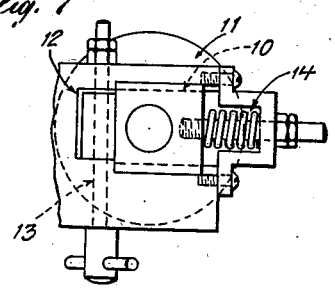
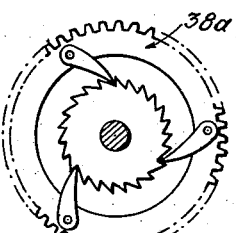
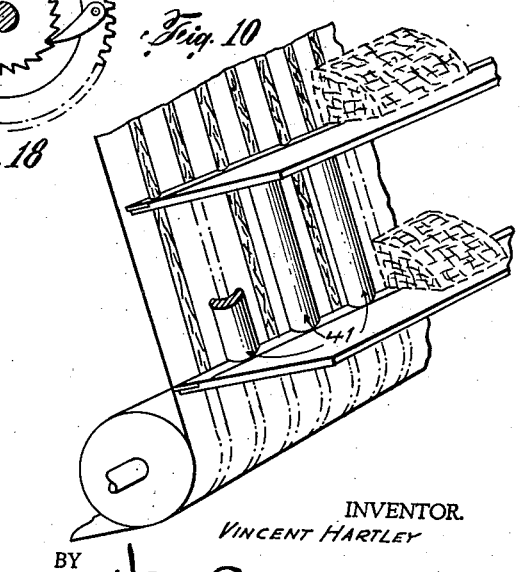
INVENTOR.
VINCENT HARTLEY
BY April 9, 1940. V. HARTLEY 2,196,917
MEANS FOR PRODUCING A SEED CARRIER
Filed Feb. 11, 1939 3 Sheets-Sheet 3
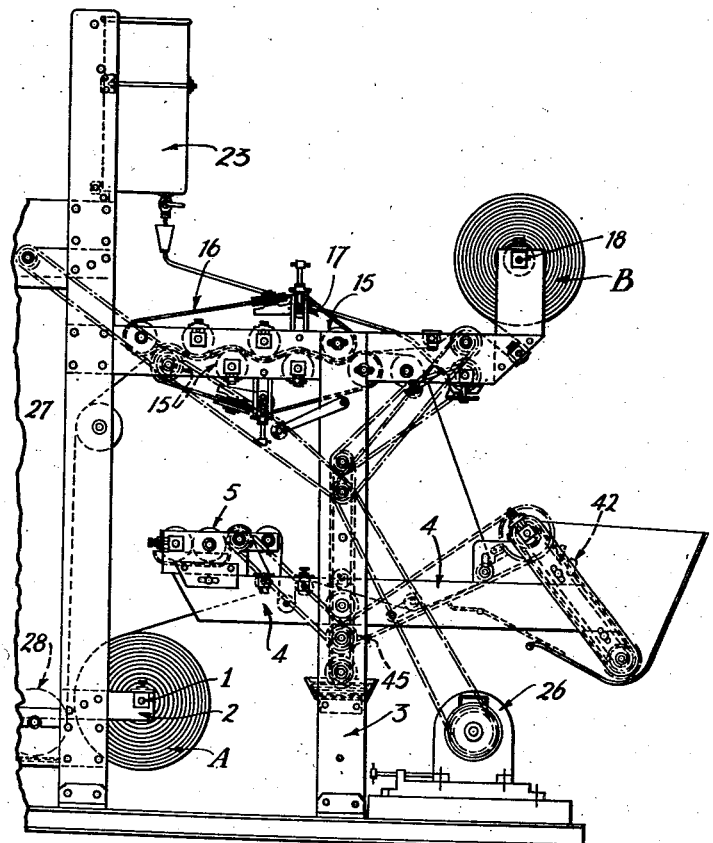
FIG.11.
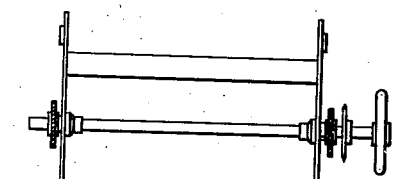
FIG.12.
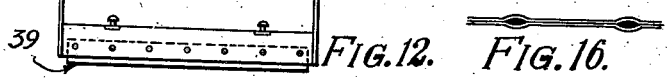
FIG.15.
FIG.16.
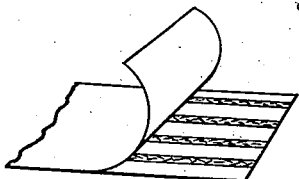
FIG.17.
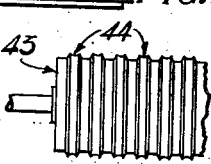
FIG.13. FIG.14.
Inventor:
Vincent Hartley
By his Attorney: Walter Swan.

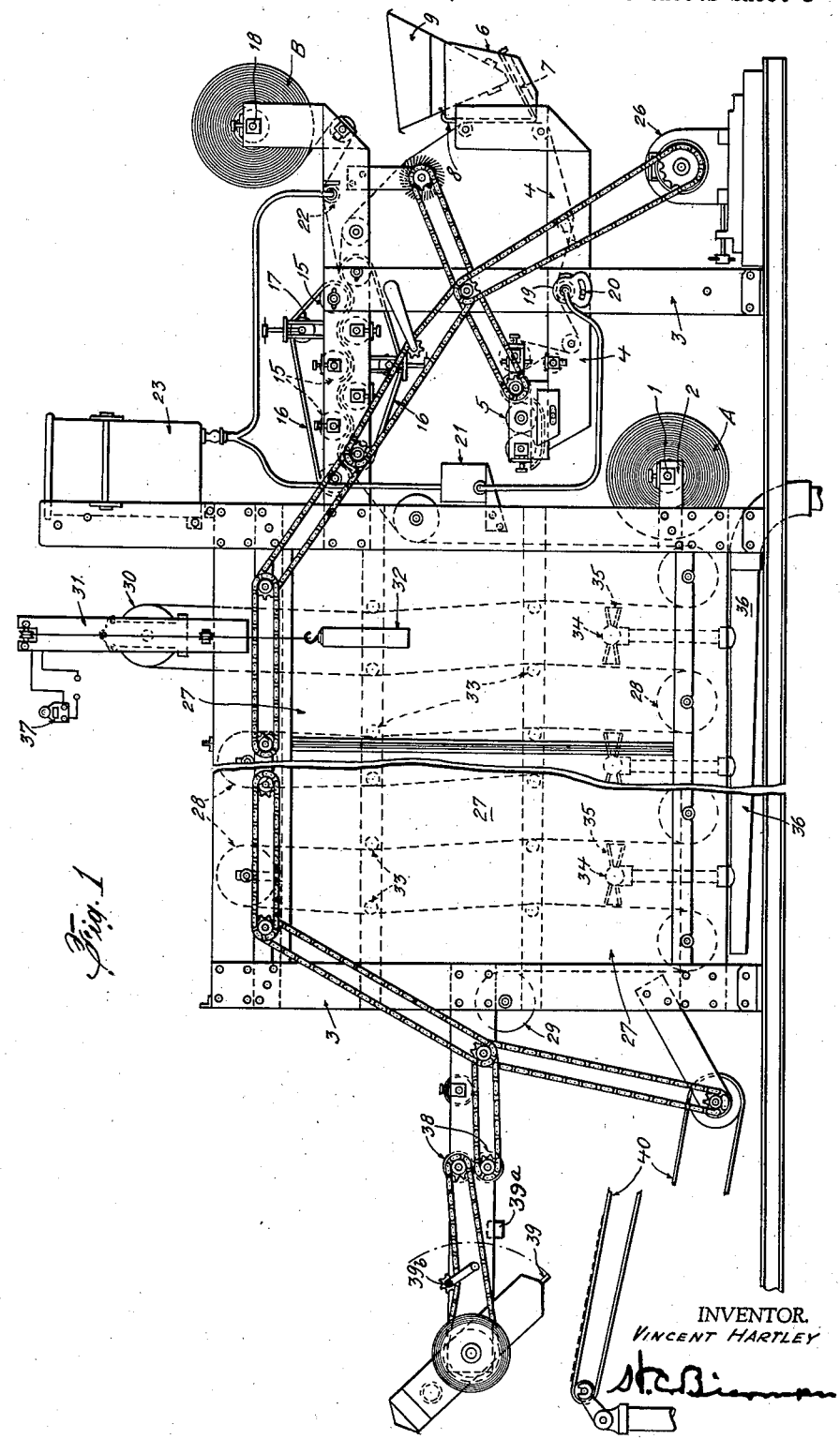

Patented Apr. 9, 1940

2,196,917

UNITED STATES PATENT OFFICE 2,196,917

MEANS FOR PRODUCING A SEED CARRIER

Vincent Hartley, Greenfield, England

Application February 11, 1939, Serial No. 256,000
In Great Britain November 17, 1937

10 Claims. (Cl. 93—3)

This invention relates to means for storing and sowing seeds, whether seeds of grass, of flowers or of vegetables.

The most usual method of sowing seeds hitherto employed is to sprinkle them loosely in or on the soil, as evenly distributed as possible, with the intention of removing some of the resulting seedlings if they come up too close together; or, on the other hand, of filling up bare places with other seeds or seedlings if they come up too far apart. The disadvantages of such unregulated sowing are seen most prominently in connection with grass plots or lawns, where to obtain a regular even growth is difficult.

In attempts to overcome some of the drawbacks attendant upon such unregulated and sometimes promiscuous sowing of seeds, and at the same time to simplify the operation of sowing, it has been proposed to pack the seeds in carriers comprising strips of paper, the seeds being spaced apart in the carriers at the required distances, and the operation of sowing the seeds consisting in merely burying the carrier strip in the soil. Such proposals, however, have not hitherto reached practical success, since there have been many difficulties to overcome in producing a commercially saleable article, principally in spacing and securing the seeds in or on the carriers; in finding a carrier which, while adequately protecting the seeds before sowing, will not hinder the germination of the seeds when in the soil; and also, in providing a carrier of large area suitable for use in the sowing of a lawn or other grass plot.

In my earlier application Serial No. 174,818 filed November 16, 1937, I have described and claimed improved seed sowing means comprising two webs of paper of the kind commonly known as rice paper, which is of a soluble nature disintegrable in the presence of moisture, or like soluble paper, and such webs are secured together by adhesive with spaced seeds enclosed in between them, preferably in air pockets. A convenient arrangement is to have lines of seeds with the seeds close together side-by-side in each "line" on one web, and to cause the other web to bridge each of the lines as a whole, thus entrapping a quantity of air between the seeds of each line.

The object of the present invention is to provide an improved method and means for producing seed-storing and seed-sowing means of the type above referred to.

In the drawings accompanying this specification:

Fig. 1 represents a side elevation of a machine characterised according to the invention;

Figs. 2 and 3 are enlarged sectional views illustrating the feed hopper shown in Fig. 1;

Figs. 4 and 5 are a cross-sectional elevation and a broken side elevation respectively of the means for applying adhesive to the enclosing web;

Fig. 6 is a like view to Fig. 4 of the means for applying the seed-holding adhesive;

Fig. 7 is an enlarged end view of a printing roller hereinafter referred to, and of means for rendering that roller inoperative;

Figs. 8 and 9 are end view and broken side view respectively of a beater roll for assisting the removal of surplus seeds;

Fig. 10 is a broken perspective view to illustrate the multiple hopper for presenting seeds of different kind to the same web.

Fig. 11 is a like view to Fig. 1, but illustrating modified feeding and adhesive-applying means.

Fig. 12 is an end view of the cutting-off arrangement shown in Fig. 1.

Figs. 13 and 14 illustrate a modified adhesive-applying means.

Figs. 15 and 16 illustrate details hereinafter described.

Fig. 17 is a picture view of a portion of a carrier made by the machine illustrated, but partly opened to show the interior; and Fig. 18 is a plan of a part of the delivery end of the machine shown in Fig. 1.

As shown in Figs. 1 to 9, the improved machine comprises a supporting shaft 1 for a supply roll of paper A, the shaft 1 being housed in bearings 2 on a framework 3. Carried by one end of horizontal bars 4 in the framework 3, is a printing unit 5, whilst on the other end of the said horizontal bars 4 is a hopper, which comprises end walls 6, an inclined floor 7, and edge guides 8, the web of paper from the roll 1 forming a front wall of the hopper in co-operation with the edge guides 8. Loosely carried by the end walls 6 of the hopper, is a further hopper 9 as shown more particularly in Fig. 2. The inclined floor plate 7, as shown in Fig. 3, has a scalloped lower edge so as not to contact with those parts of the paper web which carry stripes of adhesive, and the general arrangement is such that the seeds from the hopper 9 trickle down the inclined floor 7 and contact with the paper, where they are picked up by the adhesive and carried away.

In the printing unit 5 there is provided a sliding bearing 10 for the roller 11, which roller presses the paper web against the actual printing roller, and co-operating with such sliding bearing 10 are a cam 12 and a spindle 13, the rotation of the cam displacing the bearing against the resistance of spring 14, and thereby separating the roller 11 from the printing roller when it is not desired to print.

Mounted in a horizontal bar of the main frame 3, are a series of rollers 15, around which are endless felts 16, suitable tensioning rollers 17 being provided. Also carried by that horizontal bar of the frame 3 is a further spindle 18 for a second roll of paper B.

Carried by the main frame 3 is a slotted tube 19, a section of which is shown in Fig. 6, which tube is angularly adjusted, securing means 20 being provided to hold it in a set position. The web of paper A from the roll 1, after passing through the printing unit 5, is caused to slide over the slotted tube 19, which tube is filled with adhesive by gravity from a tank 21, the result being that parallel stripes of adhesive are placed on the paper web, which web then passes to the seed hopper to collect seeds, and finally passes to the endless felts 16. By rotating the tube 19 slightly, the slots may be uncovered at one end to allow adhesive to come out, whereby a wider stripe is obtained.

Carried in the upper part of the frame 3, is a further slotted tube 22, shown more particularly in Figs. 4 and 5, also fed by gravity with adhesive, from the tank 23, and the paper B from the roll 18 passes over such tube so as to close the slots, whereby parallel strips of adhesive are placed on such web, which web then passes to the endless felts 16 and is caused to adhere to the first web and to enclose the seeds. The stripes of adhesive on the paper B may be arranged to alternate with those in the paper A.

The tubes 19 and 22 are provided with shut-off valves at their ends, and the tube 22 is also provided with a concentric shutter 24 operated by the lever 25, the rotation of which shutter may regulate the degree of opening of the slots or may close those slots altogether. As will be seen from Fig. 4, the slots in the tube 22 are backed off at one end.

The machine is adapted to be driven by an electric motor 26, by suitable chain driving of the various parts, as will be clearly followed from Fig. 1.

Adjacent those parts of the machine above described, is a drying chamber 27, in which are guide rollers 28, over and under which rollers the united web is festooned, to pass out finally over the roller 29. A further roller 30 is provided whose bearings are slidable vertically in guides 31, and which is counter-balanced by weights 32, whereby an even tension may be obtained in the web in the drying chamber. The dried web is withdrawn from the drying chamber at a slower rate than that at which the undried web is fed thereto, so that the roller 30 gradually rises. The web, therefore, passes through the drying chamber at a decelerated rate and the counter-balanced roller 30 keeps the web taut. The paper web, as it passes between the several rollers 28, is guided by smaller rollers or bars 33, some or all of which may be adjustable in position to vary the tension or position of the paper; and hot air drying pipes 34 are provided to direct jets of air through guides 35 on to the web, such pipes 34 being supplied with hot air from the main trunk 36. An alarm device such as the bell 37 may be provided, whereby the operator may be warned of the roller 30 having reached the top of its stroke, in which position it is incapable of accumulating any further length of the united web.

As the united web, now dried, emerges from the chamber 27, it is fed through delivery rollers 38 and is severed into even lengths by a balanced rotating knife 39 (see Figs. 1 and 12), co-operating with a stationary knife 39ª scissor fashion, the separated lengths falling on to an endless belt conveyor 40, and being delivered thereby into or on to any desired receptacle. The delivery rollers 38, and rotating knife 39, are driven by chains, the motive power being obtained from the motor 26; but a ratchet and pawl free-wheel device is provided in the wheel 38a on the axis of the lower roller 38, see Fig. 18, which allows the rotating knife and rollers 38 to be made to over-run the dryer, by means of the handwheel 39b and temporarily accelerate delivery, and thereby remove excess lengths which may have accumulated between the first roller 28 and the counter-balanced roller 30, the result of which over-running is to bring the roller 30 downwards.

The drying chamber 27 is enclosed on all sides, preferably by means of easily removable panels.

In Figs. 8 and 9 is shown a roller having a number of felt strips, these being spirally arranged, and such roller is positioned and driven so as to cause the felt strips to beat the under side of the web as it leaves the hopper, as shown for example in Fig. 1 the effect of such beating being to dislodge any loose seeds carried up by the web, which dislodged seeds fall back into the hopper.

Referring now to Fig. 10, there is shown a two-part hopper, each part being adapted to contain seeds of different size or different shape from the other part, and shields 41 of hollow semi-circular section are provided to prevent alternate stripes of gum contacting with the seeds in the lower hopper, and to prevent the seeds picked up in the lower hopper from contacting with and being dislodged by those in the higher hopper.

Referring now to Fig. 11 a modified form of hopper is shown, this comprising an endless bucket-conveyor 42, which collects seeds from the hopper and drops them on the inclined adhesive web, the surplus seeds falling down the web back in to the hopper. As shown in this arrangement also, the stripes of gum which are to hold the seeds are supplied by means of a grooved roller 43, illustrated more clearly in Figs. 13 and 14.

The adhesive employed in this form of machine is of a viscous nature so as not to spread on the paper, but rather to stand up as a ridge. The gumming roller 43 has a number of grooves 44, and is so adjusted with regard to a spreading roller 45 as to pick up sufficient adhesive to stand up from the grooves. The paper web A is brought into the gum, but does not press on the roller, and picks up a thickness of adhesive as shown in Fig. 15. A thin adhesive, merely soaking into the paper, would not hold the seeds sufficiently.

As will appear from Figs. 16 and 17 the webs A and B are caused to bridge over several seeds in each row and thus leaves an air pocket between and around the seeds.

What I claim is:

1. A machine for producing a seed carrier, comprising means for supporting two rolled webs of paper, means for drawing the webs from the rolls, means for applying adhesive to one side of one web in parallel stripes lengthwise of the web as it leaves the roll, and separate means for applying adhesive to one side of the other web as it leaves the roll, means for supplying to the first-named web a quantity of seeds more than sufficient to cover the adhesive stripes, means for removing from that web the seeds not held by the adhesive, means for applying the two webs to each other to enclose the seeds between them, and means for drying the united webs.

2. A machine for producing a seed carrier, comprising means for uniting two webs of paper together by adhesive so as to enclose seeds between them, a drying chamber and means for feeding the newly-united webs thereto, and means for withdrawing the dried web from the drying chamber at a slower rate than that at which the undried web is fed thereto, and for cutting off equal lengths of the dried web, after it leaves the drying chamber, which means includes a free-wheel device to allow of its being accelerated to over-run its drive and withdraw any surplus seed carrier accumulating in the drying chamber.

3. A machine for producing a seed carrier, comprising means for holding two rolled webs of paper, means for drawing the webs from the rolls, means for applying longitudinal parallel stripes to one face of one web after it leaves its roll, means for guiding the adhesive web through, and so that it forms one wall of a seed hopper, means for applying longitudinal parallel stripes of adhesive to one face of the other web after it leaves its roll, means to guide the webs into contact with the adhesive and seeds between them and with the stripes on one web alternating with those on the other web, and spring-pressed endless felts between which the united webs pass and by which they are fed to a drying chamber.

4. A machine for producing a seed carrier, having means for uniting two webs of paper face to face with seeds between them, and including a seed hopper comprising end walls, an inclined floor, and guides for one of the paper webs, said guides and floor being so disposed that the web, floor and end walls together form a receptacle for the seeds in which the seeds gravitate down the floor towards the web.

5. A machine according to claim 4, and including a removable hopper with narrow outlet slot at its lower end and means for supporting the removable hopper on the said end walls so that its outlet slot is in close proximity to, but out of contact with the inclined floor.

6. A machine for producing a seed carrier, having means for uniting two webs of paper face to face with seeds between them, and including a seed hopper comprising end walls, guides on said end walls for one of the webs of paper whereby the web is constituted one wall of the hopper and at least two seed supports carried by and between the end walls and inclined downwardly towards the web, with shields above each seed support to isolate selected parts of the web from seeds on the support.

7. A machine for producing a seed carrier having means for applying longitudinal parallel stripes of adhesive to a web of paper and for securing another web of paper thereto face to face, including a hopper with inclined seed supports and means for drawing the adhesive face of the web past the lower edges of the supports, the supports having notches in the lower edges to accommodate the stripes of adhesive, and hollow shields above each support, in the path of the web, to isolate selected stripes from the seeds on the supports.

8. A machine for producing a seed carrier comprising means for applying longitudinal parallel stripes of adhesive to two webs of paper, means for depositing seeds on the stripes of one web, means for bringing the webs together adhesive face to adhesive face with the stripes of one alternating with the stripes on the other, means for feeding the united webs to and through a heated drying chamber at a decelerated rate, counterbalanced means for keeping the drying webs taut, means for cutting off equal lengths of dried webs, a common driving means for traversing and severing the webs, and means for over-running the cutting-off means in co-operation with the said counter-balancing means.

9. In a machine for producing a seed carrier, having means for enclosing seeds between two webs of paper secured face to face by adhesive and having a drying chamber to dry out the adhesive from the webs, a balanced rotary knife and a stationary knife to co-operate therewith in scissor fashion, feed rollers for feeding the carrier over the stationary knife from the drying chamber, an undriven counterbalanced roll in movable bearings adjacent the drying chamber for keeping the web taut by taking up any increased length of web in the chamber, means for driving the rotary knife and the feed rollers, including a ratchet and pawl drive, and a hand-wheel on the axis of the knife for manual acceleration of the knife and feed rollers by over-running the ratchet and pawl drive to extract from the chamber the surplus length taken up by the counterbalanced roll.

10. In a machine for producing a seed carrier by enclosing seeds between two webs of paper secured face to face by adhesive, means for applying seed to one web comprising an endless bucket conveyor, a hopper to hold seeds to supply them to the conveyor, and means for guiding the adhesive web in an inclined path in the path of seeds discharged by the conveyor.

VINCENT HARTLEY.